US011486639B2

(12) United States Patent
Ileleji et al.

(10) Patent No.: US 11,486,639 B2
(45) Date of Patent: Nov. 1, 2022

(54) MULTIPURPOSE SOLAR DRYING TRAY ASSEMBLIES AND METHODS THEREFOR

(71) Applicant: Purdue Research Foundation, West Lafayette, IN (US)

(72) Inventors: Klein Erhekabor Ileleji, Carmel, IN (US); Heeju Kim, Chicago, IL (US)

(73) Assignee: Purdue Research Foundation, West Lafayette, IN (US)

( * ) Notice: Subject to any disclaimer, the term of this patent is extended or adjusted under 35 U.S.C. 154(b) by 372 days.

(21) Appl. No.: 16/717,376

(22) Filed: Dec. 17, 2019

(65) Prior Publication Data

US 2020/0191479 A1 Jun. 18, 2020

Related U.S. Application Data

(60) Provisional application No. 62/780,509, filed on Dec. 17, 2018.

(51) Int. Cl.
*F26B 3/32* (2006.01)
*F26B 3/28* (2006.01)
*A23L 3/54* (2006.01)

(52) U.S. Cl.
CPC ............... *F26B 3/286* (2013.01); *A23L 3/54* (2013.01); *A23V 2002/00* (2013.01)

(58) Field of Classification Search
CPC .. F26B 3/286; F26B 9/003; F26B 9/06; F26B 25/16; A23L 3/54; A23V 2002/00; Y02B 40/18

USPC .................... 34/522, 192–194, 204, 237, 238
See application file for complete search history.

(56) References Cited

U.S. PATENT DOCUMENTS

| | | | | |
|---|---|---|---|---|
| 92,113 | A * | 6/1869 | Smith | F26B 5/044 312/210.5 |
| 3,596,770 | A * | 8/1971 | Heinrich | C14B 1/26 248/300 |
| 4,157,620 | A * | 6/1979 | Chakerian | F26B 7/00 426/259 |
| 2015/0253077 | A1* | 9/2015 | De Bruin | F26B 25/16 34/179 |

FOREIGN PATENT DOCUMENTS

JP 11290047 * 4/1998 ............. Y02A 40/90

* cited by examiner

*Primary Examiner* — John P McCormack
(74) *Attorney, Agent, or Firm* — Hartman Global IP Law; Gary M. Hartman; Domenica N. S. Hartman

(57) ABSTRACT

Tray assemblies and methods of their use to dry products with sunlight. Such a tray assembly includes at least a first base having four side walls, a bottom wall, legs configured to support the bottom wall above the surface when resting thereon, side wall holes in the side walls, and bottom wall holes in the bottom wall. A cover is releasably coupled to the base to define an enclosure between the cover, the side walls, and the bottom wall. At least one window is provided in the cover to allow infrared radiation to pass therethrough that is absorbed by interior surfaces of the base to cause an increase in a temperature within the enclosure sufficient to increase a rate of drying products located within the enclosure.

20 Claims, 17 Drawing Sheets

MULTIPURPOSE SOLAR DRYING TRAY ASSEMBLIES AND METHODS THEREFOR

CROSS-REFERENCE TO RELATED APPLICATIONS

This application claims the benefit of U.S. Provisional Application No. 62/780,509 filed Dec. 17, 2018, the contents of which are incorporated herein by reference.

STATEMENT REGARDING FEDERALLY-SPONSORED RESEARCH OR DEVELOPMENT

This invention was made with government support under Contract No. AID-OAA-L-14-00003 awarded by the US Agency for International Development. The government has certain rights in the invention.

CROSS REFERENCE TO RELATED APPLICATIONS

This application is related to U.S. patent application Ser. No. 29/650,725, filed Jun. 8, 2018, the contents of which are incorporated herein by reference.

BACKGROUND OF THE INVENTION

The present invention generally relates to solar-based drying/dehydrator devices. The invention particularly relates to a multipurpose solar drying tray assembly suitable for drying food products and the like.

While various solar drying/dehydrator devices are commercially available, the most common global practice for drying crops involves using a flat platform such as on a concrete pad, tarred road, rocks, tarp, plastic sheet, or even the bare ground. These practices are predicted to be currently performed by over two billion smallholder farmers in developing countries including areas such as the humid tropics of Africa, Asia, and the Americas. These practices may provide little or no barrier between the crop and bare ground, and may have the crops exposed to the elements and various sources of contamination including but not limited to dust, feces of livestock, and livestock pilferage, which can cause quality deterioration via contamination. As a result, small growers incur billions of dollars yearly in post-harvest losses of crops because of the lack of affordable and reliable drying technologies that produce high quality dried crops in these regions.

Additionally, small growers of specialty crops in the United States of America often lack drying technologies suitable for their desired scale and therefore resort to using various homemade apparatuses which may not meet government food grade standards. For example, fruits and vegetables in the U.S.A. crops are commonly dried in the open sun on wooden trays. In many cases, fruits that are directly exposed to the sun need to be rewashed before consumed or processed.

In view of the above, it can be appreciated that there is an ongoing demand for improved solar drying/dehydrator devices that are capable of at least partly overcoming or avoiding the problems, shortcomings or disadvantages noted above.

BRIEF DESCRIPTION OF THE INVENTION

The present invention provides tray assemblies and methods of use thereof that are suitable for drying products with sunlight, particularly the infrared spectrum, in an efficient, hygienic, and scalable manner.

According to one aspect of the invention, a tray assembly configured to rest on a surface is provided that includes at least a first base having four side walls, a bottom wall, and legs configured to support the bottom wall above the surface when resting thereon, a plurality of side wall holes in the side walls and a plurality of bottom wall holes in the bottom wall, and a cover configured to releasably couple to the base to thereby define an enclosure between the cover, the side walls, and the bottom wall. At least one window is provided in the cover and configured to allow infrared radiation to pass therethrough that is absorbed by interior surfaces of the base to cause an increase in a temperature within the enclosure sufficient to increase a rate of drying products located within the enclosure.

According to another aspect of the invention, a method of drying products with a tray assembly is provided. The tray assembly includes at least a first base having four side walls, a bottom wall, and legs configured to support the bottom wall above the surface when resting thereon, a plurality of side wall holes in the side walls and a plurality of bottom wall holes in the bottom wall, a cover configured to releasably couple to the base and thereby define an enclosure between the cover, the side walls, and the bottom wall, and at least one window in the cover. The method includes inserting the products into an interior of the base such that the products rest on the bottom wall, coupling the cover to the base to thereby enclose the products within the enclosure, and then allowing infrared radiation to pass through the window and be absorbed by interior surfaces of the base to cause an increase in a temperature within the enclosure sufficient to increase a rate of drying of the products.

Technical effects of the method and tray assembly described above preferably include the ability to provide a simple and hygienic means for drying various products.

Other aspects and advantages of this invention will be appreciated from the following detailed description.

DETAILED DESCRIPTION OF THE INVENTION

Figure 1:
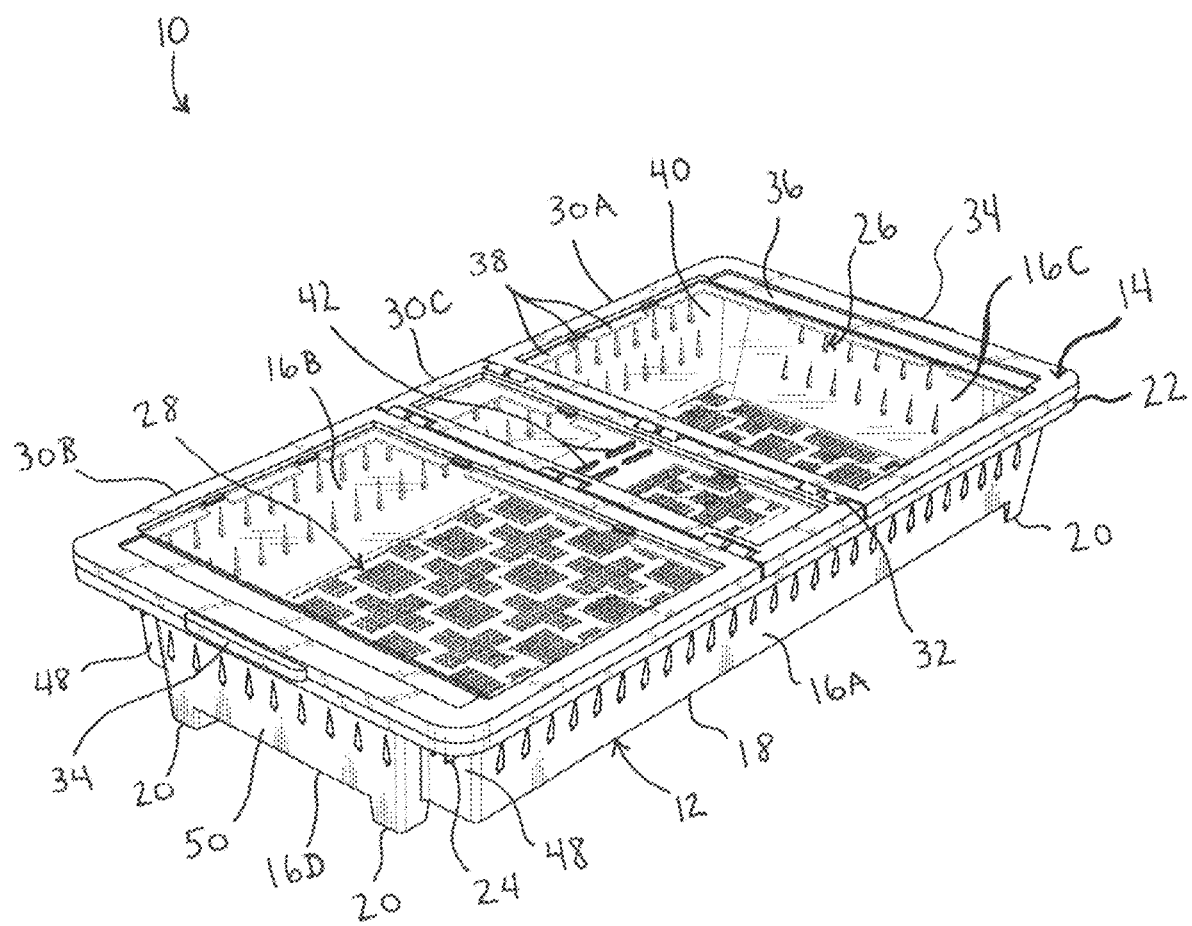
FIG. 1 is a perspective view of a first embodiment of a multipurpose solar drying tray assembly comprising a tray and a cover in accordance with certain nonlimiting aspects of this invention.
Figure 2:
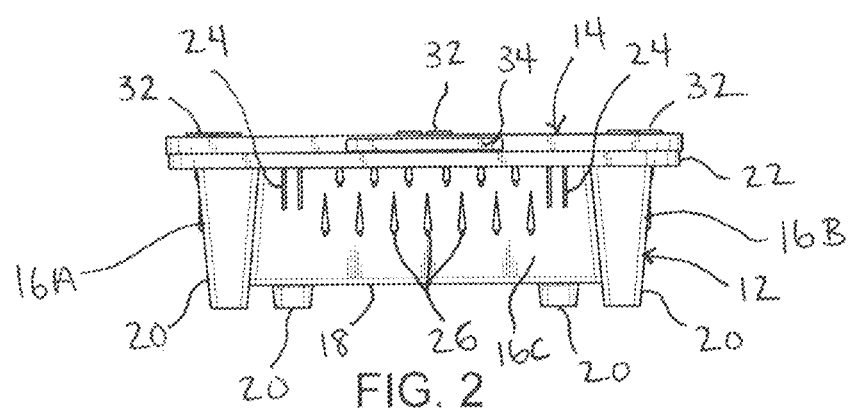
FIG. 2 is a right elevational end view of the multipurpose solar drying tray assembly of FIG. 1.
Figure 3:
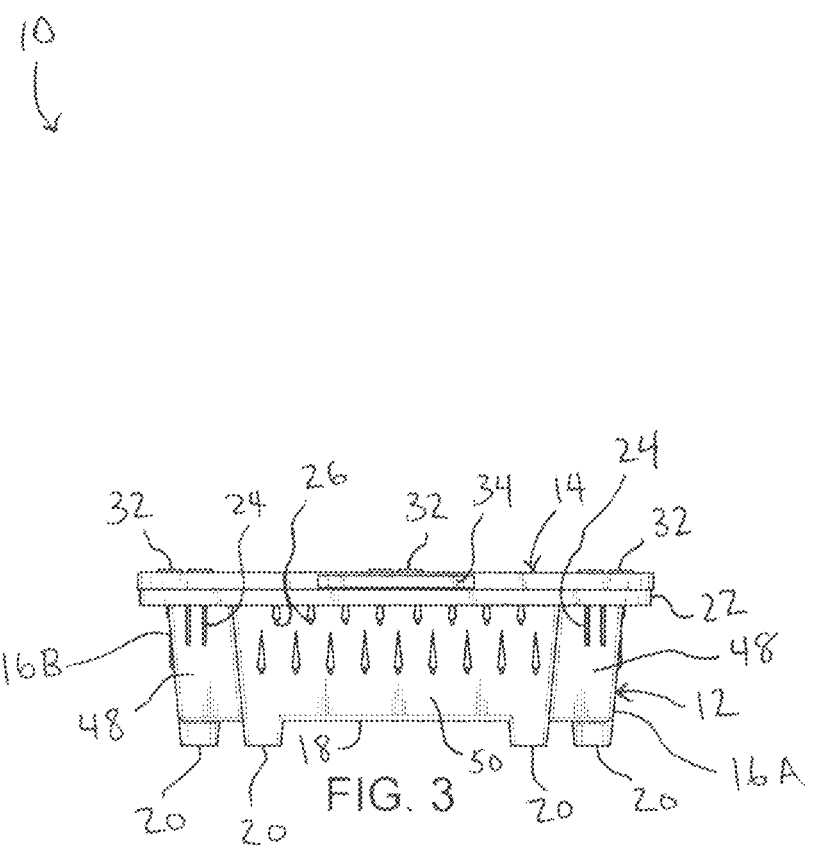
FIG. 3 is a left elevational end view of the multipurpose solar drying tray assembly of FIG. 1.
Figure 4:
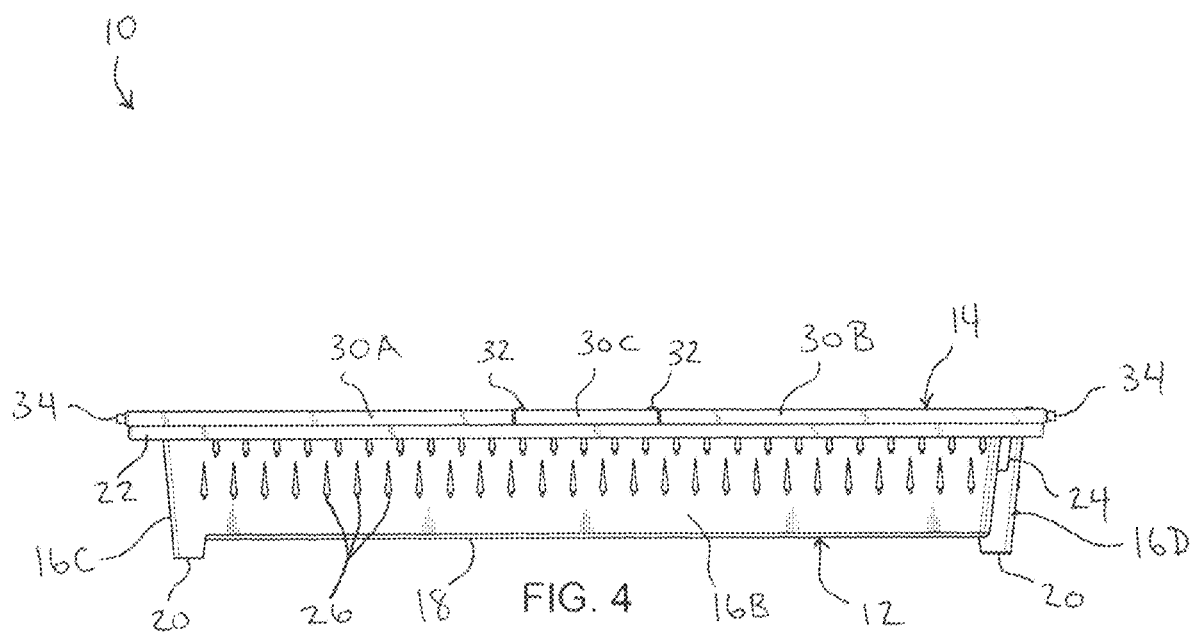
FIG. 4 is a rear elevational view of the multipurpose solar drying tray assembly of FIG. 1.
Figure 5:
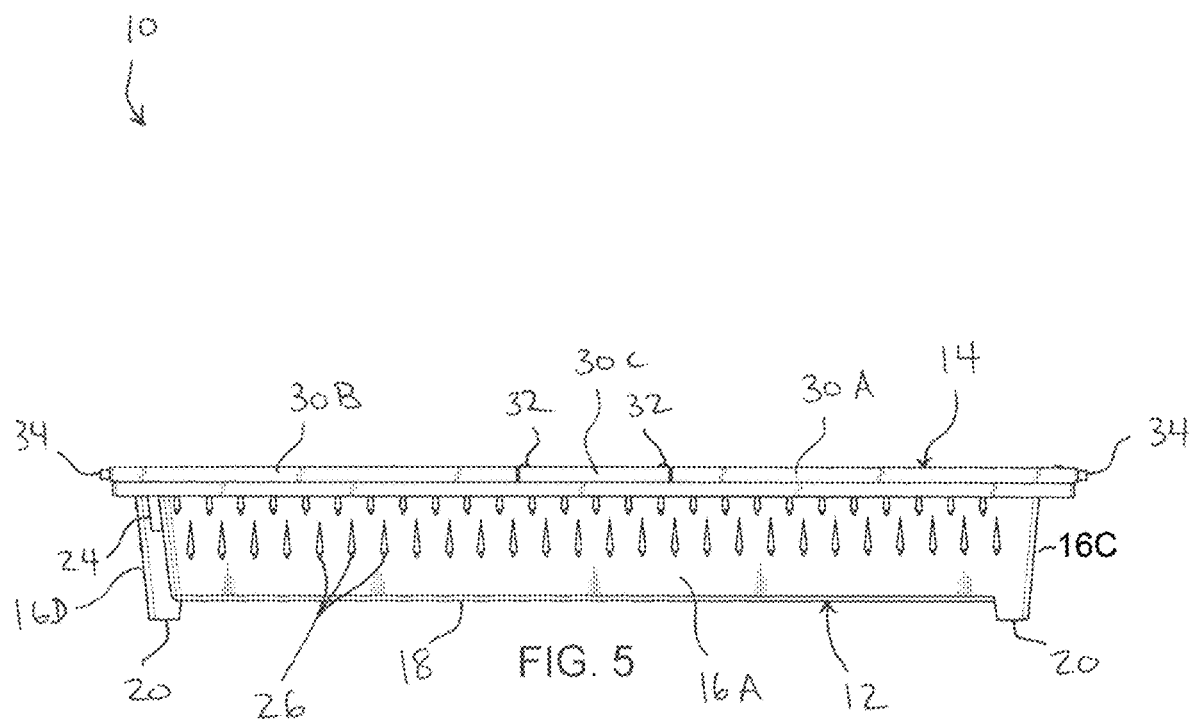
FIG. 5 is a front elevational view of the multipurpose solar drying tray assembly of FIG. 1.
Figure 6:
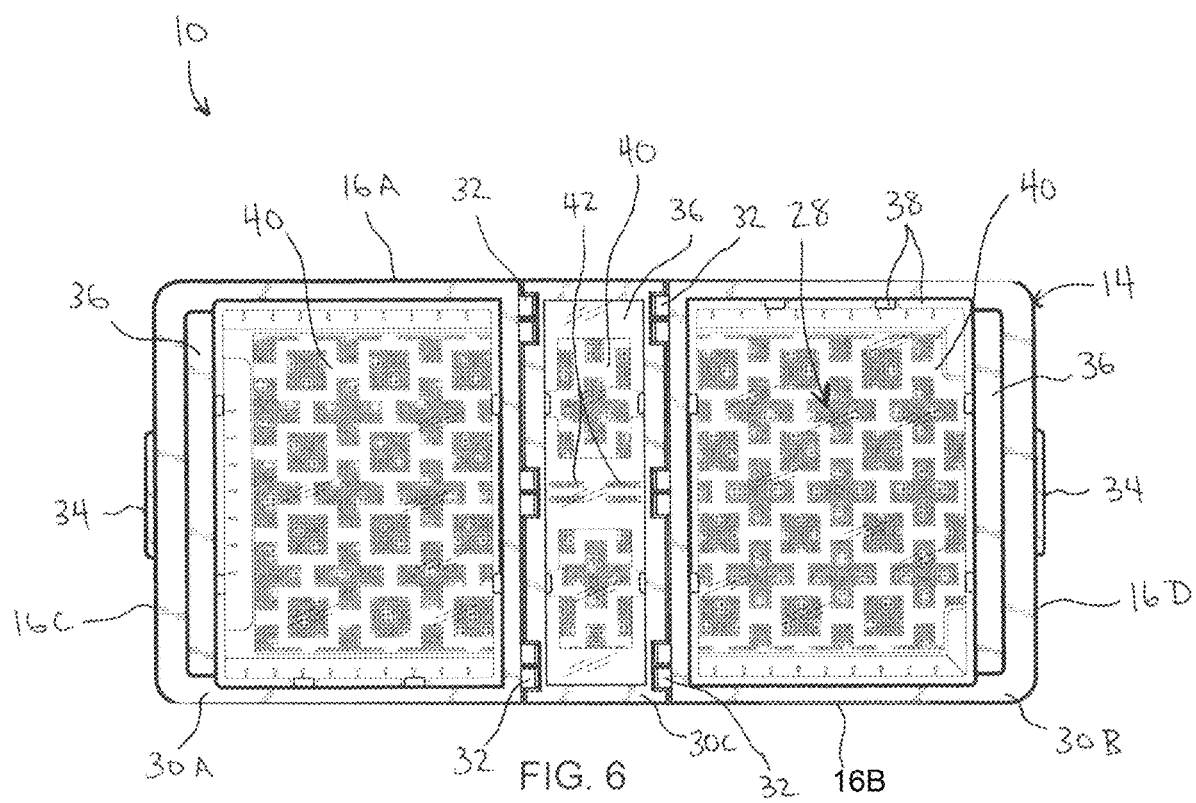
FIG. 6 is a top view of the multipurpose solar drying tray assembly of FIG. 1.
Figure 7:
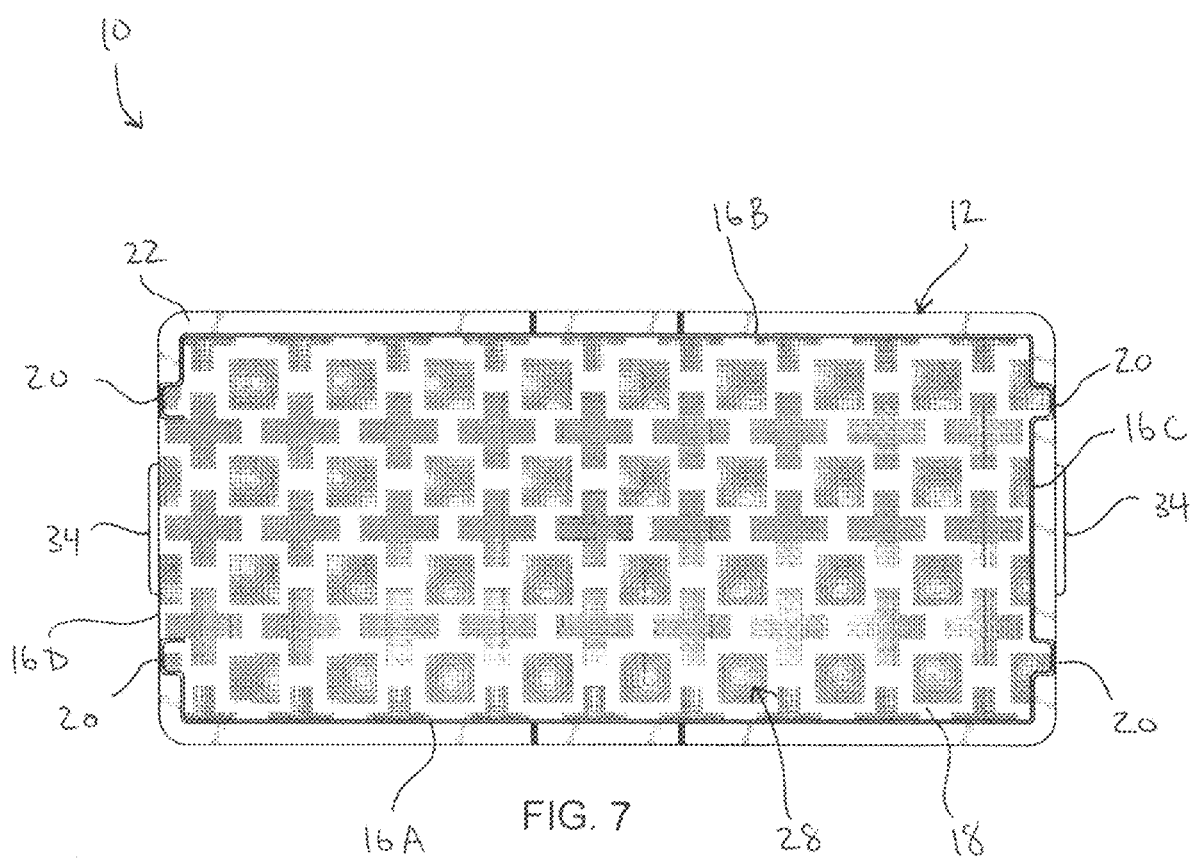
FIG. 7 is a bottom view of the multipurpose solar drying tray assembly of FIG. 1.
Figure 8:
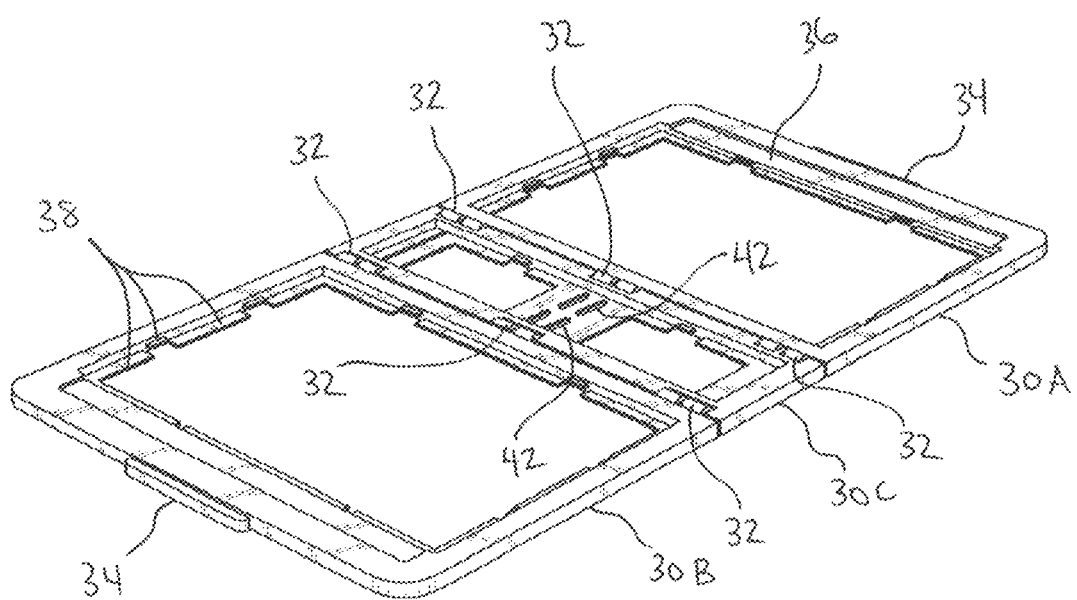
FIG. 8 is an isolated perspective view of the cover of the multipurpose solar drying tray assembly of FIG. 1.
Figure 9:
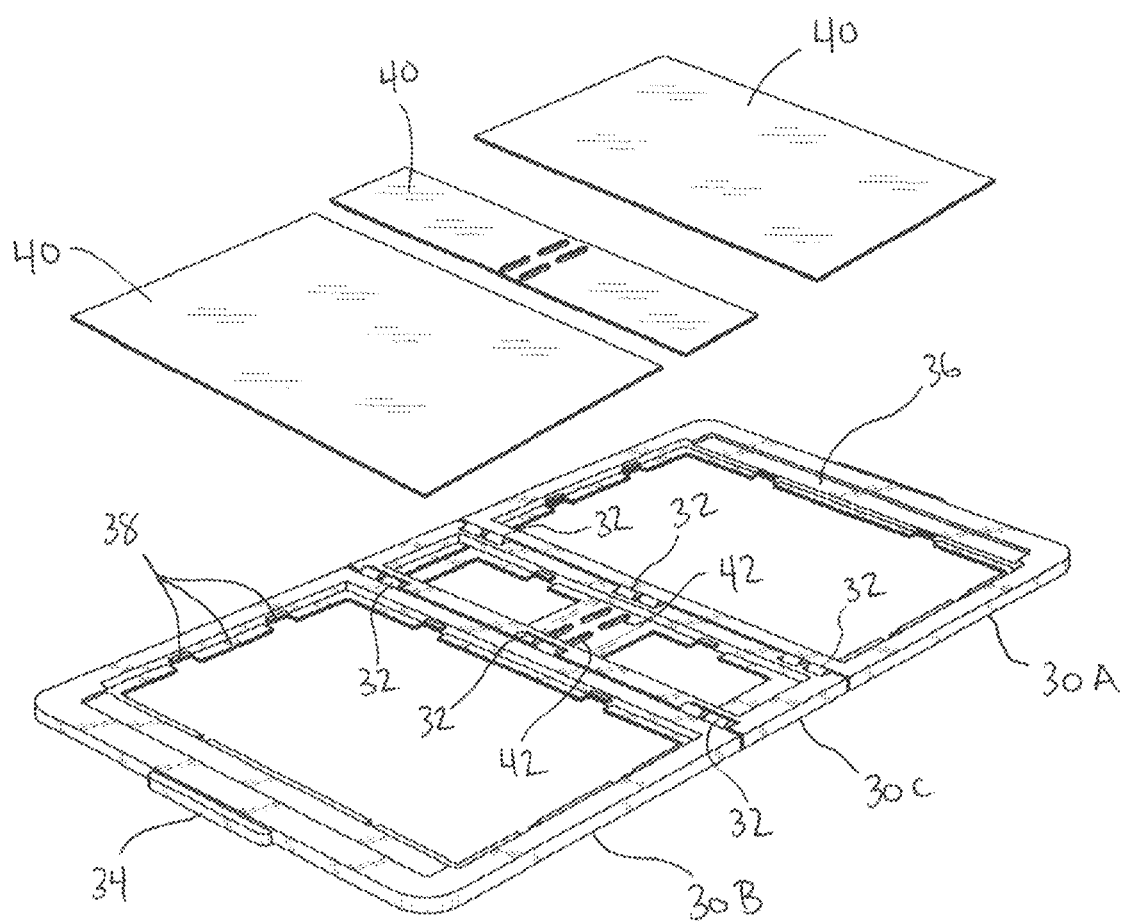
FIG. 9 is an exploded perspective view of the cover of the multipurpose solar drying tray assembly of FIG. 1.

FIGS. 1 through 10 represent a nonlimiting multipurpose solar drying tray assembly 10 suitable for use in sun drying a wide range of products, including but not limited to grains, pulses and oilseeds, fruits and vegetables, tubers, processed foods and feed, fish, meats, and crops including cocoa, coffee, tea, sheanuts, hops, medicinal plants, herbs, and spices.

To facilitate the description provided below of the embodiment represented in the drawings, relative terms, including but not limited to, "vertical," "horizontal," "lateral," "front," "rear," "side," "forward," "rearward," "upper," "lower," "above," "below," "right," "left," etc., may be used in reference to an orientation of the tray assembly 10 during its operation, and therefore are relative terms that indicate the construction and use of the invention and therefore help to define the scope of the invention.

The tray assembly 10 includes a base 12 having four side walls 16A, 16B, 16C, and 16D and a bottom wall 18, and further includes a lid or cover 14 configured to assemble with the base 12 to define an enclosure between the interior surfaces of the base 12 and the cover 14. Each of the side walls 16A, 16B, 16C, and 16D are shown as generally having a slope that extends outward away from the bottom wall 18 from a lower edge to an upper edge of each of the side walls 16A, 16B, 16C, and 16D. Though optional, sloping side walls 16A, 16B, 16C, and 16D are required if there is a desire or need to nest the bases 12 of multiple tray assemblies 10 to conserve space during packaging, transportation and stowage, as evident from FIG. 10. Two legs 20 are located on lower edges of the base 12 at each of the side walls 16C and 16D. The legs 20 are configured to elevate and support the bottom wall 18 above a surface (not shown) on which the base 12 is located such that air can freely flow below the bottom wall 18. A lip 22 is located along the perimeter of the base 12 along upper edges thereof, and can be seen to extend outward from the side walls 16A, 16B, 16C, and 16D. The lip 22 is desirable to promote the ability of the tray cover 14 to create a tight and substantially air-tight fit at the upper perimeter of the base 12.

A plurality of side wall holes 26 are provided through the side walls 16A, 16B, 16C, and 16D to provide ventilation therethrough. Additional bottom wall holes 28 are provided through the bottom wall 18 for ventilation and moisture drainage. Although FIGS. 1 through 10 represent the side wall holes 26 and bottom wall holes 28 arranged in specific patterns, the represented patterns are nonlimiting and other arrangements are foreseeable and within the scope of the invention. In addition, it is foreseeable that the tray assembly 10 may not include the side wall holes 26 and/or bottom wall holes 28 in certain embodiments.

In the embodiment represented in the drawings, the side walls 16A and 16B are identical to one another, that is, mirrored relative to a geometric plane therebetween, whereas the side walls 16C and 16D have different structural features from one another. It should be understood that other embodiments are foreseeable wherein the side walls 16C and 16D are also identical to one another (i.e., mirrored), for example, both having the same structural features represented in the drawings. As most clearly visible in FIG. 2, the side wall 16C includes a leg 20 at corners thereof which connect with the side walls 16A and 16B. A central portion 46 between the pair of legs 20 is recessed toward the interior of the base 12 relative to the legs 20. As mostly clearly visible in FIG. 3, the side wall 16D includes end portions 48 with an intermediate portion 50 therebetween and a leg 20 at corners of the intermediate portion 50.

Figure 10:
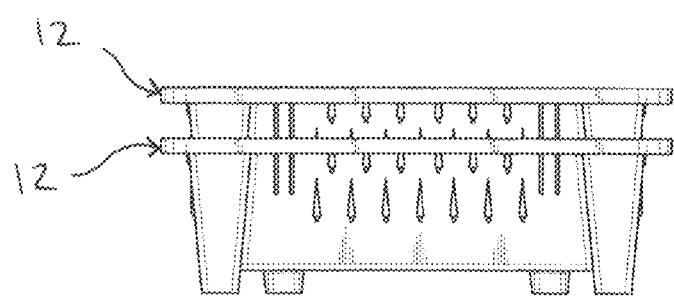
FIG. 10 is a right elevational end view of the tray of the multipurpose solar drying tray assembly of FIG. 1 nested with an identical tray.

Notably, the intermediate portion 50 extends farther toward an end of the tray assembly 10 relative to the end portions 48 providing recessed areas at the end portions 48 under the lip 22. Located in these recessed areas are members 24 configured to limit the depth that the tray assemblies 10 may be inserted into one another when nested or stacked, as represented in FIG. 10. Therefore, the length of the members 24 along a height of the tray assembly 10 may be based on the intended application of the tray assembly 10. For example, the length may be configured to provide sufficient space between the bottom walls 12 of adjacent stacked tray assemblies 10 for specific products to be dried. Preferably, the members 24 are fixed against extended portions of the lip 22 and exterior surfaces of the side wall 16D to provide additional structural support therefor. For applications in which multiple tray assemblies 10 are stacked during drying, the bottom wall holes 28 are particularly beneficial for providing good airflow distribution and efficient use of rising ambient air therethrough for increased air-to-product interaction.

During use, products to be dried may be located within the enclosure defined between the interior surfaces of the base 12 and the cover 14 coupled thereto. In embodiments where multiple tray assemblies 10 are stacked, a cover 14 may be coupled to the lip 22 of the uppermost tray assembly 10 within the stack to effectively cover all of the tray assemblies 10 within the stack. The cover 14 may include handles 34 for ease of transport. Alternatively, the handles 34 may be located on edges of the lip 22.

Figure 11:
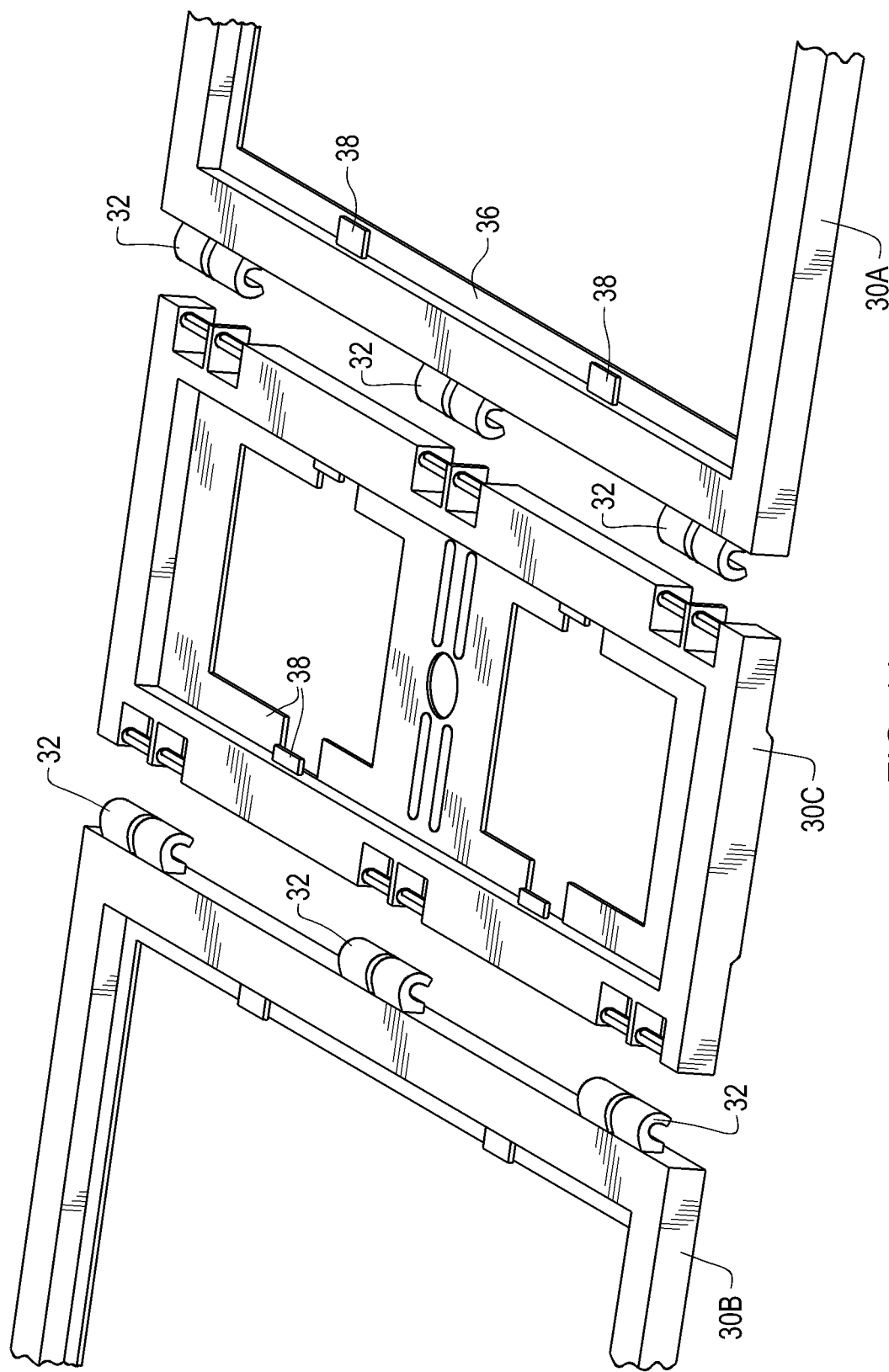
FIGS. 11 and 12 are isolated views of the hinges of the multipurpose solar drying tray assembly of FIG. 1 in disassembled and assembled configurations, respectively.
Figure 12:
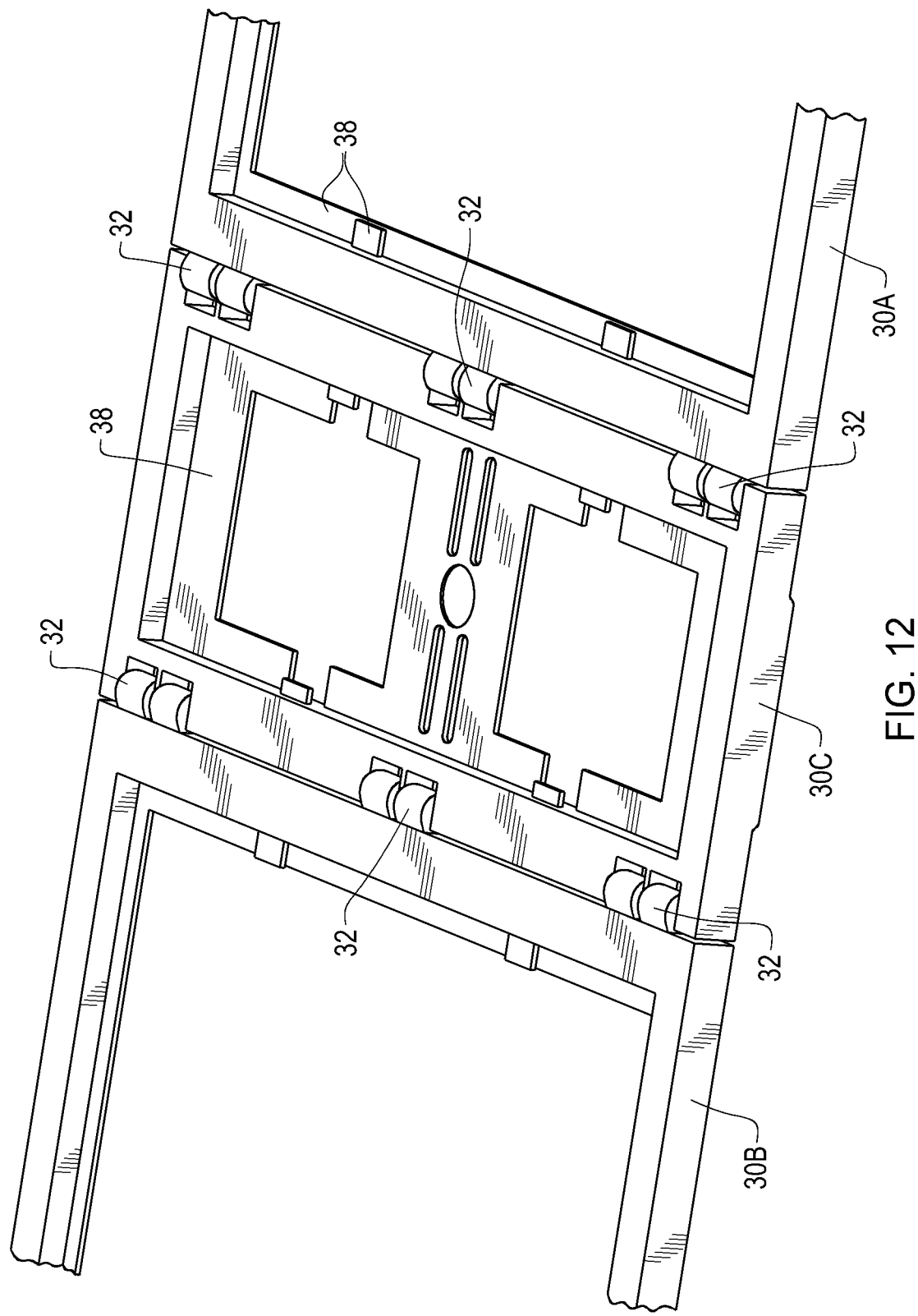

The embodiment represented in the drawings includes a frame with three sections 30A, 30B, and 30C, though more or fewer sections are also within the scope of the invention. Although not required, the outer sections 30A and 30B are preferably coupled to the middle section 30C with hinges 32. FIGS. 11 and 12 show isolated views of the hinges 32 uncoupled and coupled, respectively, for clarity. With this arrangement, once the cover 14 is coupled to the lip 22, the middle section 30C preferably remains in a relatively fixed location while one or both of the outer sections 30A and 30B may be selectively uncoupled from the lip 22 and pivoted relative to the middle section 30C to provide access to the interior of the tray assembly 10.

Figure 13:
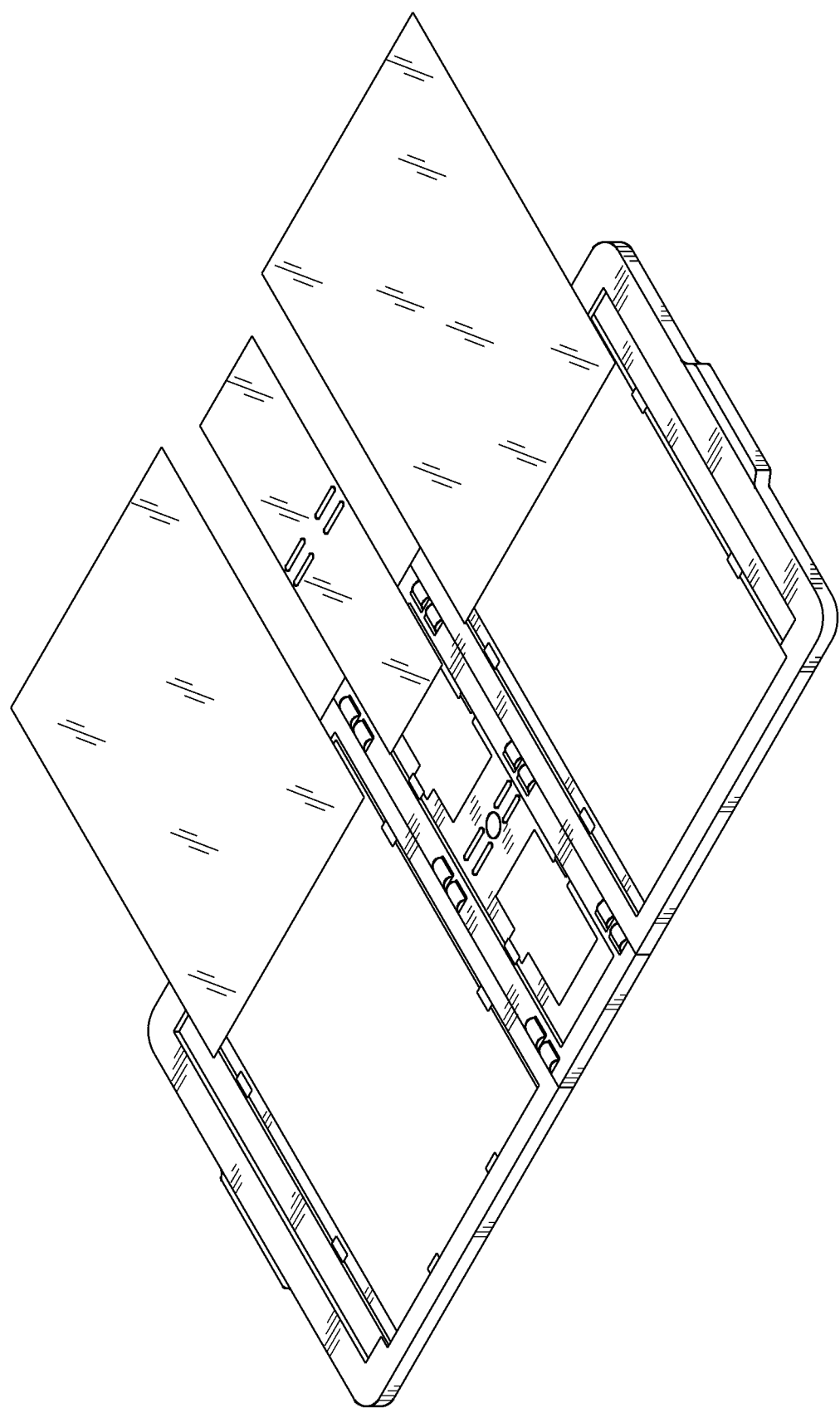
FIGS. 13 and 14 represent methods of inserting window panes into recessed areas of the cover of the multipurpose solar drying tray assembly of FIG. 1.
Figure 14:
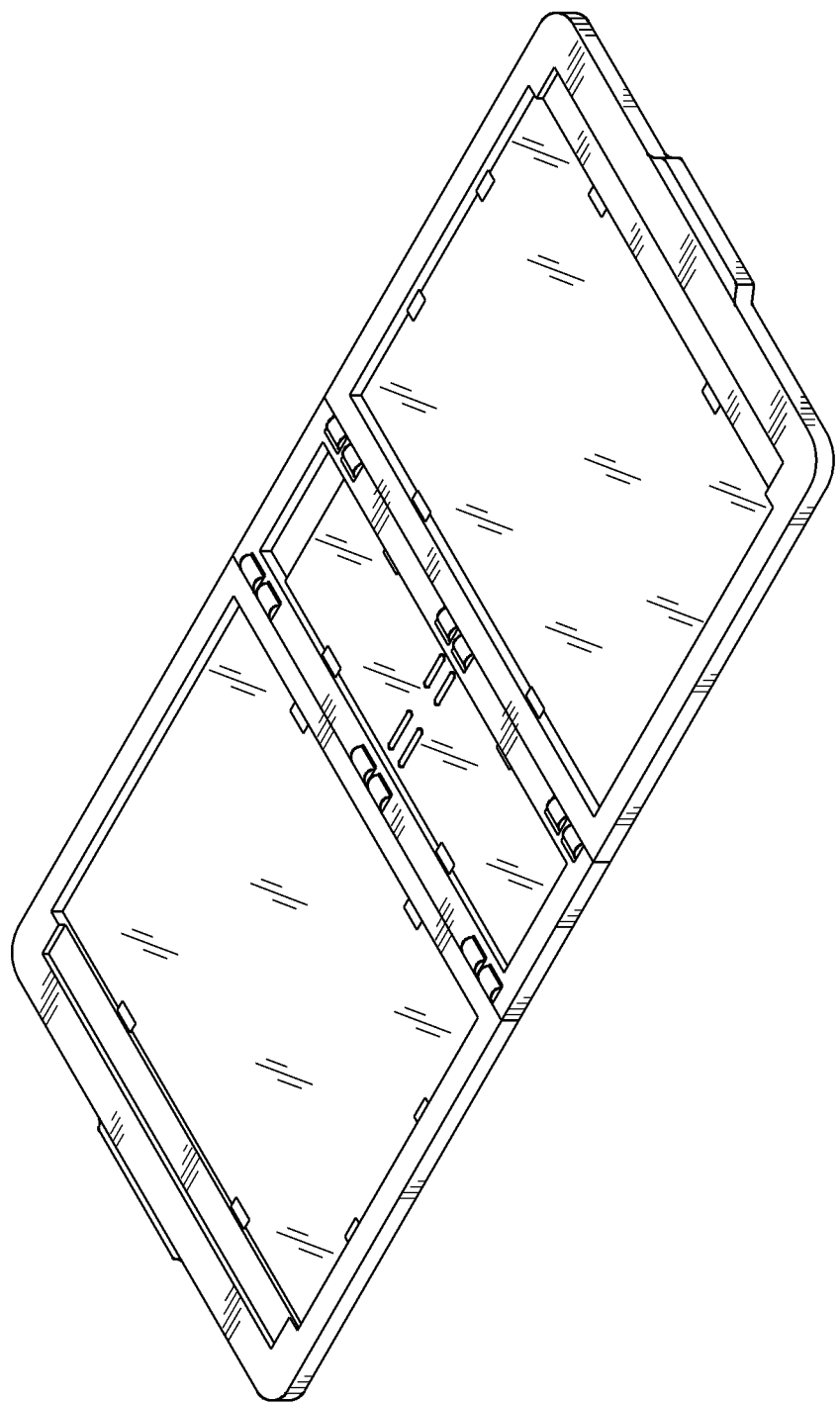

The cover 14 includes windows through which light can enter while the cover 14 is coupled to the base 12. Preferably, the windows include removable window panes 40. As a nonlimiting example, FIGS. 13 and 14 represent a method of inserting window panes 40 into the sections 30A, 30B, and 30C of the cover 14. As represented, each window pane 40 may be slid between a plurality of tabs 38 located along inner perimeters of corresponding sections 30A, 30B, and 30C. As discussed in further detail below, the window panes 40 may be formed of various transparent or semitransparent materials and may optionally be configured to filter certain light spectrum wavelengths. As a nonlimiting example, one or more of the window panes 40 may be formed of Federal Drug Administration (FDA) approved polypropylene with or without ultraviolet (UV) light filtering properties.

The cover 14 may include vents 42 comprising holes through the frame, window panes 40, or both depending on location. The vents 42 are preferably sized and located to ventilate the enclosure so as to reduce the likelihood of overheating products being dried within the tray assembly 10. Alternatively or in addition, the cover 14 may include a powered venting device having a fan configured to control the temperature and relative humidity within the tray assembly 10. Such an embodiment may include electronic temperature and relative humidity sensors and controls and a display panel (e.g., LCD display).

The tray assembly 10 may be formed of various materials, including polymers, metals, ceramics, and composites thereof. Due to their intended use, the tray assembly 10 is preferably formed of one or more UV light-protected plastics that have been approved by the FDA for food processing. The tray assembly 10 and its components may have various colors either for aesthetic or utilitarian purposes. However, as sunlight is primarily relied on as the means for increasing the temperature in the enclosure of the tray assembly 10, darker colors such as black, brown, and blue are preferred for at least the interior surfaces of the base 12 to promote the absorption of infrared radiation. As nonlimiting examples, colors with a solar absorptivity of greater than 0.60, more preferably 0.85 or more, are believed to be preferred to maximize heat absorbing capacity by absorbing radiation in the infrared spectrum of sunlight. In some cases lighter colors, for example, orange, may be acceptable and desirable at least one the exterior surfaces of the base 12 and cover 14 to provide ease of visually locating the tray assembly 10. However, often at least the bottom interior surface of the bottom wall 18 of the base 12 is a dark color to maximize heat absorption by the base 12, which is then radiated into the enclosure to increase the temperature within the enclosure.

As noted above, the window panes 40 are preferably removable. The window panes 40 may be formed of a durable transparent material, such as plexiglass, which is capable of transmitting up to about 92% or more of UV light. However, in some cases window panes 40 may be preferred that are capable of blocking UV light at various levels (for example, transmit less than 92% of UV light) or to selectively allow only certain wavelengths of light to pass through may be preferred, for example, to protect sensitive foods being dried from the bleaching and nutrient degrading effect of UV light. In such cases, it is desirable to replace UV-transparent window panes 40 with tinted window panes 40 that are capable of blocking at least a portion of the UV radiation incident on the window panes 40. In further embodiments, it may be desirable that the window panes 40 are intended to serve as heat panels by having the ability to absorb infrared radiation and then radiate thermal energy into the enclosure, similar to the interior surfaces of the base 12. The ability to easily replace the window panes 40 enables the tray assembly 10 to be quickly modified as may be needed to suit a particular crop or food being dried.

Generally, under ordinary conditions heat generation within the enclosure can be summarized as follows: (1) by direct heating of interior surfaces of the base 12 from the sunlight infrared spectrum or solar irradiation, which is able to pass through the window panes 40 but is not reflected back through the panes 40 to thereby heats the air and crop/food within the enclosure (greenhouse effect); (2) by radiative heating from the interior surfaces of the bottom wall 18 and side walls 16A, 16B, 16C, and 16D of the base 12, which absorb solar irradiation and radiate heat inside the enclosure (black body effect); and (3) by conduction of heat absorbed from the bottom wall 18 and side walls 16A, 16B, 16C, and 16D of the base 12 by the crops or food in direct contact with their surfaces. By selecting an appropriate ratio of the total interior surface area of the base 12 to the volume of the enclosure within the tray assembly 10, the air enclosed by the tray assembly 10 can be more rapidly heated than ambient air surrounding the exterior of the assembly 10.

The tray assembly 10 is configured to sun dry products under the cover 14 in a hygienic environment where the products are protected from dust, birds, and livestock and provide some protection from rain. The tray assembly 10 may be used as individual or stacked drying units for drying products outside in the open sun, indoors, or alternatively inside a cabinet dryer where it can be used without the cover 14 either individually or in a stacked configuration. When exposed to light, the cover 14 provides for heat entrapment yielding a greenhouse heating effect in the microenvironment within the tray assembly 10, preferably providing for average temperature increases inside the covered tray assembly 10 of about 7° C. to 15° C., and more preferably about 10° C. or more relative to the ambient temperature of the environment surrounding the tray assembly 10, with internal temperatures reaching as high as 60° C. or higher due solely to heat provided by the light.

The tray assembly 10 provides a storage device that is simple to setup and use, and provides end users with an affordable and reliable product drying solution for various products, with particular benefits for drying high-moisture perishables. The tray assembly 10 provides a significant improvement over open sun drying as it provides a hygienic drying environment that prevents products from being contaminated during the drying process.

Figure 15:
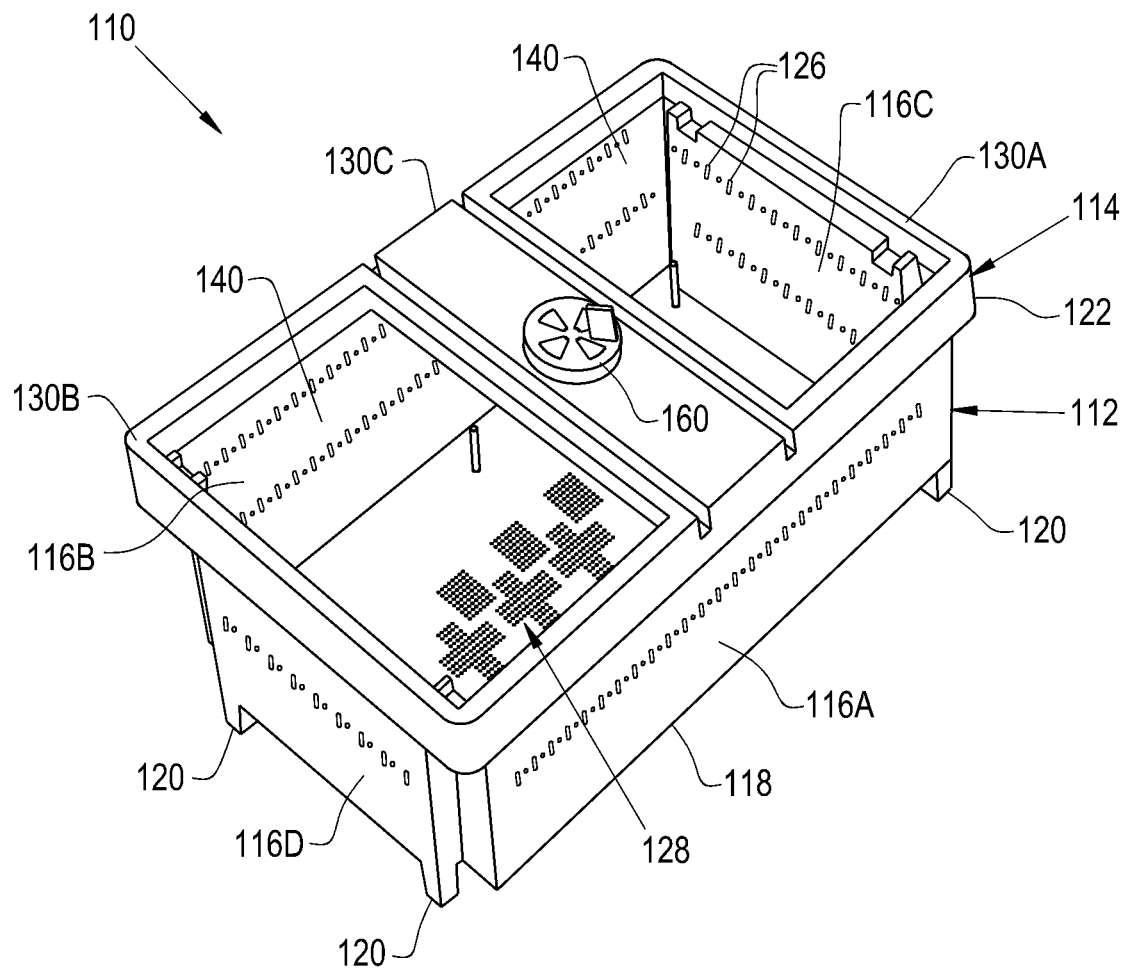
FIG. 15 is a perspective view of a second embodiment of a multipurpose solar drying tray assembly comprising a tray and a cover in accordance with certain nonlimiting aspects of this invention.
Figure 16:
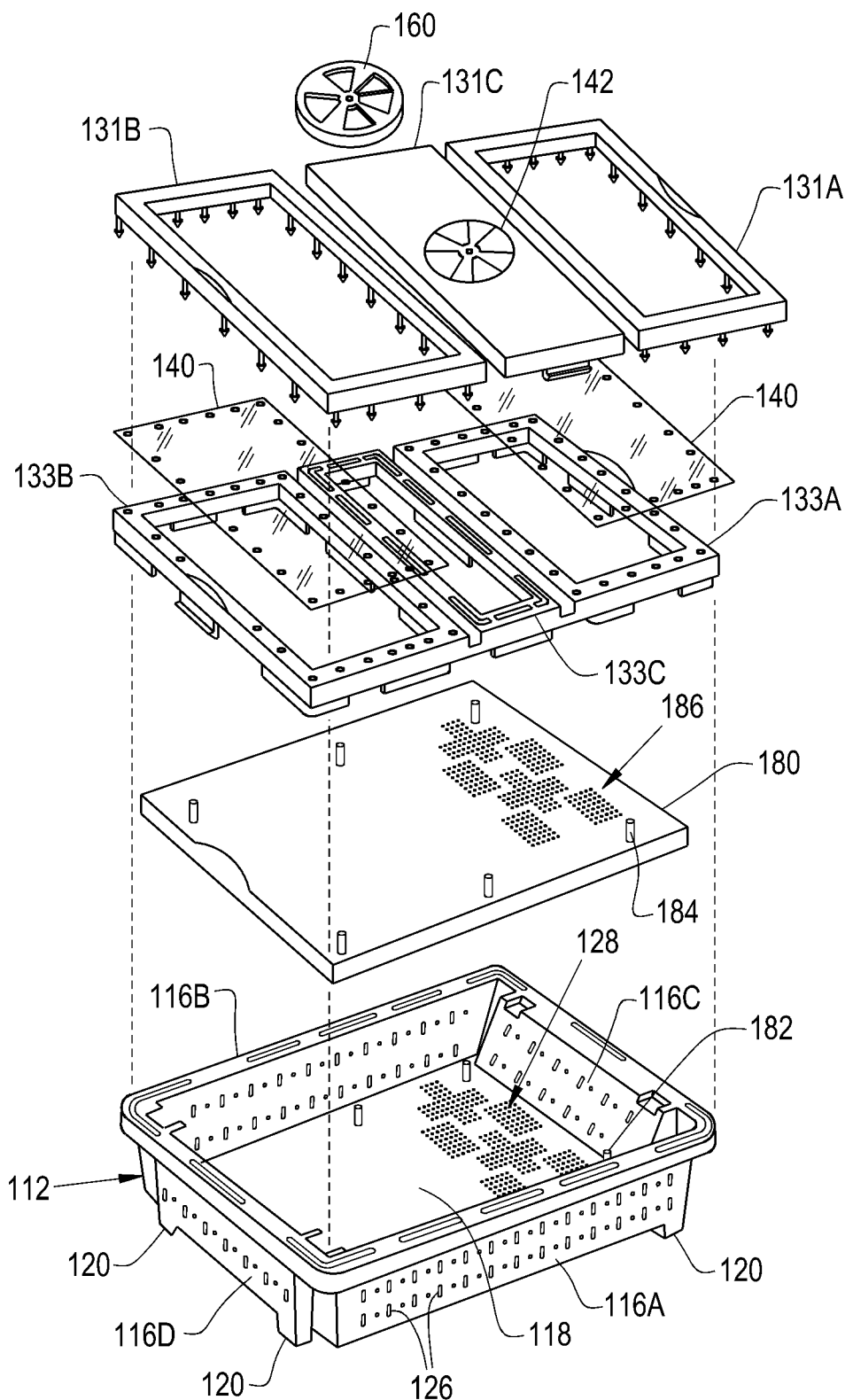
FIG. 16 is an exploded view of the components of the multipurpose solar drying tray assembly of FIG. 15.
Figure 17:
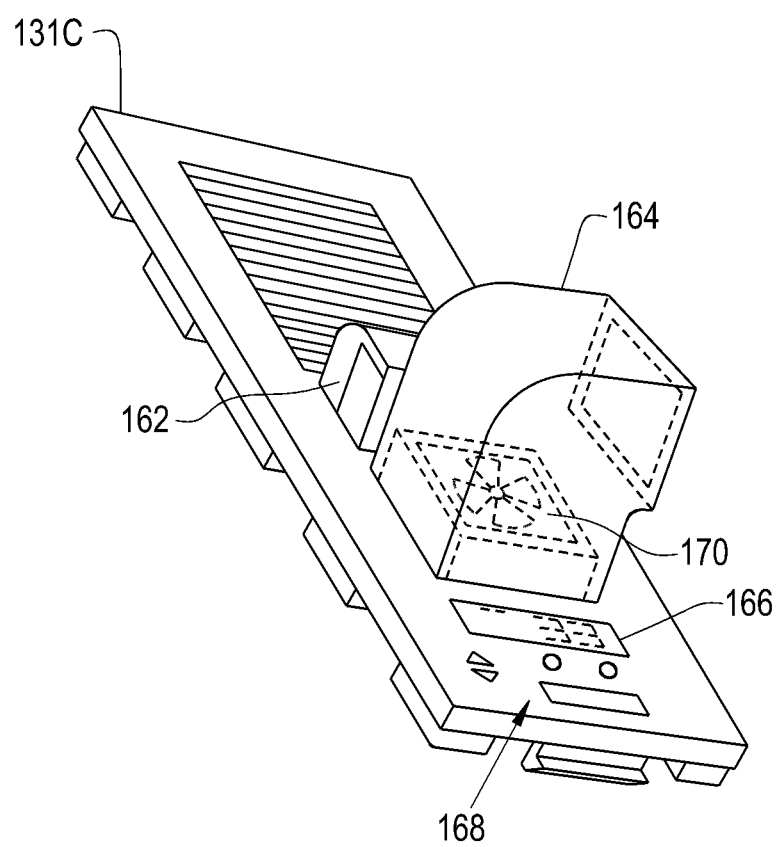
FIG. 17 is an isolated view of a powered venting device for use with the multipurpose solar drying tray assembly of FIG. 15.

FIGS. 15 through 17 depict a tray assembly 110 in accordance with a second embodiment. In these figures, consistent reference numbers are used to identify the same or functionally equivalent elements, but with a numerical prefix (1) added to distinguish the particular embodiment from the embodiment of FIGS. 1 through 14. In view of similarities between the first and second embodiments, the following discussion of the second embodiment will focus primarily on aspects of the second embodiment that differ from the first embodiment in some notable or significant manner. Other aspects of the second embodiment not discussed in any detail can be, in terms of structure, function, materials, etc., essentially as was described for the first embodiment.

The tray assembly 110 includes a cover 114 with a frame having three sections 130A, 130B, and 130C that may be coupled and decoupled from the base 112 as a whole with snap fit fasteners. As represented in FIG. 16, the sections 130A, 130B, and 130C include upper layers 131A, 131B, and 131C and lower layers 133A, 133B, and 133C that are removably coupled using fasteners, in this instance holes and corresponding pins configured to allow the upper and lower layers to snap together. The lower layers 133A, 133B, and 133C are represented as fixed to one another to form a single body. However, the lower layers 133A, 133B, and 133C could be pivotally coupled with hinges similar to the first embodiment or could be entirely separate.

In this embodiment, the window panes 140 are removably fixed between the upper layers 131A and 131B and lower layers 133A and 133B of the outer sections 130A and 130B. Optionally, the window panes 140 may include holes corresponding to the pins of the upper layers 131A and 131B. The middle section 130C includes an upper layer 131C that couples with and covers an opening in the lower layer 133C thereof. This upper layer 131C may include at least one vent 142 with a dial 160 configured to be rotated to selectively cover the vent 142 to manually control the temperature within the enclosure during a drying operation by ventilating the enclosure, as represented in FIG. 16. Alternatively, the upper layer 131C may include a power venting device as discussed previously in regard to the first embodiment. For example, the venting device may include a power source 162, a fan 170, a duct 164 for directing the air flow, a display 166, and controls 168 for adjusting the temperature and/or relative humidity within the enclosure.

One or more inserts 180 may be located within the base 112 and removably fixed relative to the bottom wall 118 to provide multiple tiers for drying products within the enclosure. Corresponding male posts 182 and female holes 184 may be provided on the bottom wall 118 and the inserts 180 to provide a gap between the bottom wall 118 and each of the inserts 180 to provide a space for any products located therein and adequate airflow. Preferably, the inserts 180 include holes 186 therethrough which may be similar in size, shape, and/or pattern to the bottom wall holes 128 in the bottom wall 118. It should be understood that some of the bottom wall holes 128 in the bottom wall 118 and holes 186 in the insert 180 are omitted from FIG. 16 for clarity.

While the invention has been described in terms of specific or particular embodiments, it should be apparent that alternatives could be adopted by one skilled in the art. For example, the tray assemblies 10 and 110 can be manufactured to have a wide range of shapes and sizes, the tray assemblies 10 and 110 and their components could differ in appearance and construction from the embodiments described herein and shown in the drawings, functions of certain components of the tray assemblies 10 and 110 could be performed by components of different construction but capable of a similar (though not necessarily equivalent) function, and various materials could be used in the fabrication of the assemblies 10 and 110 and/or their components. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A tray assembly configured to rest on a surface, the tray assembly comprising:
    at least a first base having four side walls, a bottom wall, and legs configured to support the bottom wall above the surface when resting thereon;
    a plurality of side wall holes in the side walls and a plurality of bottom wall holes in the bottom wall;
    a cover configured to releasably couple to the sidewalls of the first base and thereby define an enclosure between the cover, the side walls, and the bottom wall;
    at least one window in the cover configured to allow infrared radiation to pass therethrough that is absorbed by interior surfaces of the first base to cause an increase in a temperature within the enclosure sufficient to increase a rate of drying products located within the enclosure; and
    at least one vent in the cover configured to ventilate the enclosure to reduce the likelihood of overheating the products located within the enclosure during drying.

2. The tray assembly of claim 1, wherein the tray assembly is a first tray assembly of at least two tray assemblies, a second tray assembly of the at least two tray assemblies comprising a second base, the first base of the first tray assembly being configured to be inserted partially into the second base of the second tray assembly such that the first and second bases are stacked.

3. The tray assembly of claim 2, wherein at least one of the side walls of the first base includes a pair of end portions with an intermediate portion therebetween that extends further toward an end of the first base relative to the end portions so as to provide recessed areas at the end portions, and wherein located within the recessed areas are members configured to limit a depth that the first base may be inserted into the second base such that a gap is provided between the bottom walls of the first and second bases when stacked.

4. The tray assembly of claim 3, further comprising a lip around a perimeter of the first base along the side walls thereof, the members being fixed against extended portions of the lip and exterior surfaces of the at least one side wall.

5. The tray assembly of claim 1, wherein the cover comprises a frame having three sections that include a pair of outer sections and a middle section therebetween, the outer sections being pivotally coupled to the middle section with hinges such that when the cover is coupled to the first base the outer sections may be individually decoupled from the first base and pivoted relative to the middle section to provide access to the enclosure while at least the middle section remains coupled to the first base.

6. The tray assembly of claim 1, wherein the cover comprises a frame and the at least one window comprises a window pane that is removable from the frame.

7. The tray assembly of claim 6, wherein the frame has an opening therethrough and the window pane is located between a plurality of tabs located along an inner perimeter of the opening.

8. The tray assembly of claim 6, wherein the frame has an opening therethrough and the window pane is located between two layers of the frame.

9. The tray assembly of claim 6, wherein the window pane is formed of a transparent or semitransparent material configured to filter certain light spectrum wavelengths.

10. The tray assembly of claim 9, wherein the window pane transmits 92% or more of ultraviolet (UV) light.

11. The tray assembly of claim 9, wherein the window pane transmits less than 92% of ultraviolet (UV) light.

12. The tray assembly of claim 1, wherein the cover comprises a frame and the at least one window comprises a first window pane that is removable from the frame and replaceable with a second window pane of the tray assembly, wherein the first and second window panes transmit different levels of ultraviolet light.

13. The tray assembly of claim 1, further comprising means for manually adjusting airflow through the at least one vent.

14. The tray assembly of claim 1, further comprising a powered venting device coupled to the at least one vent, the powered venting device comprising a fan configured to control temperature and relative humidity within the enclosure during drying.

15. The tray assembly of claim 1, further comprising at least one insert configured to be located within the enclosure and removably fixed relative to the bottom wall such that a gap is provided between the insert and the bottom wall, the insert having a plurality of holes therethrough.

16. The tray assembly of claim 1, wherein the interior surfaces of the first base have a minimum solar absorptivity of 0.60.

17. The tray assembly of claim 1, wherein the interior surfaces of the first base have a solar absorptivity of 0.85 or more.

18. A method of drying products using the tray assembly of claim 1, the method comprising:
  inserting the products into an interior of the first base such that the products rest on the bottom wall;
  coupling the cover to the first base to thereby enclose the products within the enclosure; and then
  allowing infrared radiation to pass through the window and be absorbed by the interior surfaces of the first base to cause an increase in a temperature within the enclosure sufficient to increase a rate of drying of the products.

19. The method of claim 18, wherein the cover comprises a frame and the at least one window comprises a first window pane, the method comprising removing the first window pane from the frame and replacing the first window pane with a second window pane, wherein the first and second window panes transmit different levels of ultraviolet light.

20. At least two tray assemblies each configured to rest on a surface, each of the at least two tray assemblies comprising:
  at least a base having four side walls, a bottom wall, and legs configured to support the bottom wall above the surface when resting thereon;
  a plurality of side wall holes in the side walls and a plurality of bottom wall holes in the bottom wall;
  a cover configured to releasably couple to the sidewalls of the base and thereby define an enclosure between the cover, the side walls, and the bottom wall; and
  at least one window in the cover configured to allow infrared radiation to pass therethrough that is absorbed by interior surfaces of the base to cause an increase in a temperature within the enclosure sufficient to increase a rate of drying products located within the enclosure;
  wherein the base of a first tray assembly of the at least two tray assemblies is configured to be inserted partially into the base of a second tray assembly of the at least two tray assemblies such that the bases of the first and second tray assemblies are stacked; and
  wherein at least one of the side walls of the base of the first tray assembly includes a pair of end portions with an intermediate portion therebetween that extends further toward an end of the base of the first tray assembly relative to the end portions so as to provide recessed areas at the end portions, and located within the recessed areas are members configured to limit a depth that the base of the first tray assembly may be inserted into the base of the second tray assembly such that a gap is provided between the bottom walls of the bases of the first and second tray assemblies when stacked.

* * * * *